United States Patent
Mizuno et al.

(10) Patent No.: US 8,537,258 B2
(45) Date of Patent: Sep. 17, 2013

(54) SOLID-STATE IMAGING DEVICE WITH TRANSIMPEDANCE AND INTEGRATING CIRCUITS

(75) Inventors: Seiichiro Mizuno, Hamamatsu (JP); Haruhiro Funakoshi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 83 days.

(21) Appl. No.: 12/528,692

(22) PCT Filed: Feb. 28, 2007

(86) PCT No.: PCT/JP2007/053822
§ 371 (c)(1),
(2), (4) Date: Sep. 11, 2009

(87) PCT Pub. No.: WO2008/105094
PCT Pub. Date: Sep. 4, 2008

(65) Prior Publication Data
US 2010/0085459 A1 Apr. 8, 2010

(51) Int. Cl.
*H04N 3/14* (2006.01)
*H04N 5/335* (2011.01)

(52) U.S. Cl.
USPC .................. 348/300; 348/229.1; 348/302

(58) Field of Classification Search
USPC .............. 348/294, 300–308, 229.1
See application file for complete search history.

(56) References Cited

U.S. PATENT DOCUMENTS

| | | | |
|---|---|---|---|
| 5,508,507 A * | 4/1996 | Nelson et al. | 250/214 LA |
| 5,793,230 A * | 8/1998 | Chu et al. | 327/77 |
| 2006/0187329 A1* | 8/2006 | Panicacci | 348/308 |

FOREIGN PATENT DOCUMENTS

| | | |
|---|---|---|
| JP | 4-248756 | 9/1992 |
| JP | 6-30186 | 2/1994 |
| JP | 6-96215 | 4/1994 |
| JP | 7-49918 | 2/1995 |
| JP | 8-139851 | 5/1996 |
| JP | 9-233257 | 9/1997 |
| JP | 9-511616 | 11/1997 |
| JP | 10-336526 | 12/1998 |
| JP | 2001-245212 | 9/2001 |
| JP | 2002-354195 | 12/2002 |
| TW | 200608700 | 3/2006 |

OTHER PUBLICATIONS

Machine English Translation of JP 2001-245212 A (Sep. 7, 2001).*
Kunihiko Hara et al., "A Linear-Logarithmic CMOS Sensor with Offset Calibration Using an Injected Charge Signal," IEEE International Solid-State Circuits Conference, Feb. 8, 2005, pp. 354-355 and 603, Digest of Technical Papers.

* cited by examiner

Primary Examiner — Nelson D. Hernández Hernández
(74) Attorney, Agent, or Firm — Drinker Biddle & Reath LLP

(57) ABSTRACT

A solid-state imaging device 1 includes N pixel sections $10_1$ to $10_N$, transimpedance circuits 20a and 20b, integrating circuits 30a and 30b, and a difference arithmetic circuit 40. Each pixel section $10_n$ includes a photoelectric converting circuit including a photodiode, and a first holding circuit and a second holding circuit which hold an output voltage of the photoelectric converting circuit. A voltage held by the first holding circuit of each pixel section $10_n$ is input into the difference arithmetic circuit 40 through a common wire 50a, the transimpedance circuit 20a, and the integrating circuit 30a. A voltage held by the second holding circuit of each pixel section $10_n$ is input into the difference arithmetic circuit 40 through a common wire 50b, the transimpedance circuit 20b, and the integrating circuit 30b. A voltage corresponding to a difference between the voltages output from the integrating circuits 30a and 30b, respectively, is output from the difference arithmetic circuit 40.

2 Claims, 5 Drawing Sheets

SOLID-STATE IMAGING DEVICE WITH TRANSIMPEDANCE AND INTEGRATING CIRCUITS

TECHNICAL FIELD

The present invention relates to a solid-state imaging device.

BACKGROUND ART

There is known a solid-state imaging device including a plurality of pixel sections each including a photodiode which generates charges corresponding to the intensity of incident light, and a signal processing circuit which outputs voltages corresponding to the amount of charges successively output to a common wire from the plurality of pixel sections. The solid-state imaging device including the plurality of pixel sections one-dimensionally aligned can handle a larger charge quantity that a CCD cannot handle, and the length in the alignment direction of the plurality of pixel sections can be increased to, for example, 500 μm to 2 mm, and therefore, the solid-state imaging device is used as a one-dimensional image sensor in spectrometers, displacement meters, and barcode readers, etc.

In the solid-state imaging device thus configured, the common wire connecting the plurality of pixel sections and the signal processing circuit to each other is long, so that the capacity of the common wire is high. The junction capacitances of the photodiodes included in the plurality of pixel sections, respectively, are also high. Therefore, in this solid-state imaging device, it is difficult to increase the imaging speed. On the other hand, there is known a solid-state imaging device having an increased imaging speed (refer to, for example, Non-Patent Document 1).

In the solid-state imaging device described in Non-Patent Document 1, the plurality of pixel sections include, respectively, photoelectric converting circuits which include photodiodes for generating charges corresponding to the intensity of incident light and output voltages corresponding to the amount of the generated charges, and holding circuits which hold the voltages output from the photoelectric converting circuits and successively output the amount of charges corresponding to the held voltages to the common wire. With this configuration, junction capacitances of the photodiodes included in the plurality of pixel sections, respectively, can be made smaller as viewed from the signal processing circuit, and the imaging speed can be increased.

Non-Patent Document 1: K. Hara, et al., "A Linear Logarithmic CMOS Sensor with Offset Calibration Using an Injected Charge Signal," ISSCC 2005 Dig. Tech. Papers, pp. 354-355 (2005)

DISCLOSURE OF THE INVENTION

Problem to be Solved by the Invention

However, even in the solid-state imaging device configured as described in Non-Patent Document 1 described above, if the number of pixels increases, the common wire accordingly lengthens and the wiring capacity increases. When charges are transferred from the holding circuits of the plurality of pixel sections, respectively, to the signal processing circuit through the common wire, charge distribution occurs among the capacities of the holding circuits and the wiring capacity, and the voltage at the input terminal of the signal processing circuit decreases. To compensate for this voltage decrease at the input terminal, the gain of the signal processing circuit may be increased, however, in this case, the processing speed of the signal processing circuit is reduced. In other words, even in the solid-state imaging device configured as described in Non-Patent Document 1, it is difficult to realize an increase in imaging speed and an increase in imaging sensitivity simultaneously.

The present invention was made to solve the above-described problem, and an object thereof is to provide a solid-state imaging device which can realize an increase in imaging speed and an increase in imaging sensitivity simultaneously.

Means for Solving the Problem

A solid-state imaging device of the present invention includes: (1) a plurality of pixel sections including, respectively, photoelectric converting circuits which include photodiodes for generating charges corresponding to intensities of incident lights and output voltages corresponding to the amounts of the generated charges, and holding circuits which hold voltages output from the photoelectric converting circuits and successively output the charges to a common wire, the amounts of the charges output to the common wire corresponding to the held voltages; (2) a transimpedance circuit including a first amplifier, a first capacitor, and a resistor, where the first capacitor and the resistor are connected in parallel to each other and provided between an input terminal and an output terminal of the first amplifier, and the input terminal of the first amplifier is connected to the common wire; and (3) an integrating circuit which includes a second amplifier, a second capacitor, and a switch, where the second capacitor and the switch are connected in parallel to each other and provided between an input terminal and an output terminal of the second amplifier, and the input terminal of the second amplifier is connected to the output terminal of the first amplifier of the transimpedance circuit.

In this solid-state imaging device, in the pixel sections, charges are generated in response to the incidence of the light on the photodiodes, and voltages corresponding to the amounts of the generated charges are output from the photoelectric converting circuits. The voltages output from the photoelectric converting circuits are held by the holding circuits, and charge quantities corresponding to the held voltages are successively output from the holding circuits to the common wire. Charges output from the holding circuits of the pixel sections are input into the transimpedance circuit through the common wire, and a pulse current having a pulse height corresponding to the input charge quantity is output from the transimpedance circuit. The current output from the transimpedance circuit is input into the integrating circuit, and a voltage corresponding to the input current is output from the integrating circuit.

Preferably, in a solid-state imaging device of the present invention, (1) each of the plurality of pixel sections includes a first holding circuit and a second holding circuit as a holding circuit, and the solid-state imaging device further includes (2) a first common wire connected to the first holding circuit and a second common wire connected to the second holding circuit as the common wire; (3) a first transimpedance circuit connected to the first common wire and a second transimpedance circuit connected to the second common wire as the transimpedance circuit; (4) a first integrating circuit connected to the first transimpedance circuit and a second integrating circuit connected to the second transimpedance circuit as the integrating circuit; and (5) a difference arithmetic circuit which inputs voltages output from the first integrating circuit and the second integrating circuits, respectively, and outputs a voltage corresponding to a difference between the input two voltages.

In this case, a voltage held by the first holding circuit of each pixel section is input into the difference arithmetic circuit through the first common wire, the first transimpedance circuit, and the first integrating circuit. The voltage held by the second holding circuit of each pixel section is input into the difference arithmetic circuit through the second common wire, the second transimpedance circuit, and the second integrating circuit. Then, a voltage corresponding to a difference between voltages output from the first integrating circuit and the second integrating circuit, respectively, is output from the difference arithmetic circuit. Here, when the voltage held by the first holding circuit is a noise component, the voltage held by the second holding circuit is a signal component, and the noise component is superimposed on the signal component, the voltage to be output from each difference arithmetic circuit is only a signal component from which the noise component was removed. It is known that, in the charge amplifier circuit, the output voltage fluctuates after a reset operation is finished and the reset switch is opened, and this is called a reset noise. The reset noise generated in the photoelectric converting circuit is removed by the two holding circuits described above.

In the solid-state imaging device of the present invention, preferably, the capacity of a capacitor for holding a voltage in the holding circuit is in the range of 1 pF to 2 pF, and the capacity of the first capacitor of the transimpedance circuit is in the range of 1 pF to 5 pF (more preferably, 1 pF to 3 pF). This case is preferable particularly to increasing the imaging speed and imaging sensitivity.

Effect of the Invention

The present invention can realize an increase in imaging speed and an increase in imaging sensitivity simultaneously.

DESCRIPTION OF SYMBOLS

Figure 1:
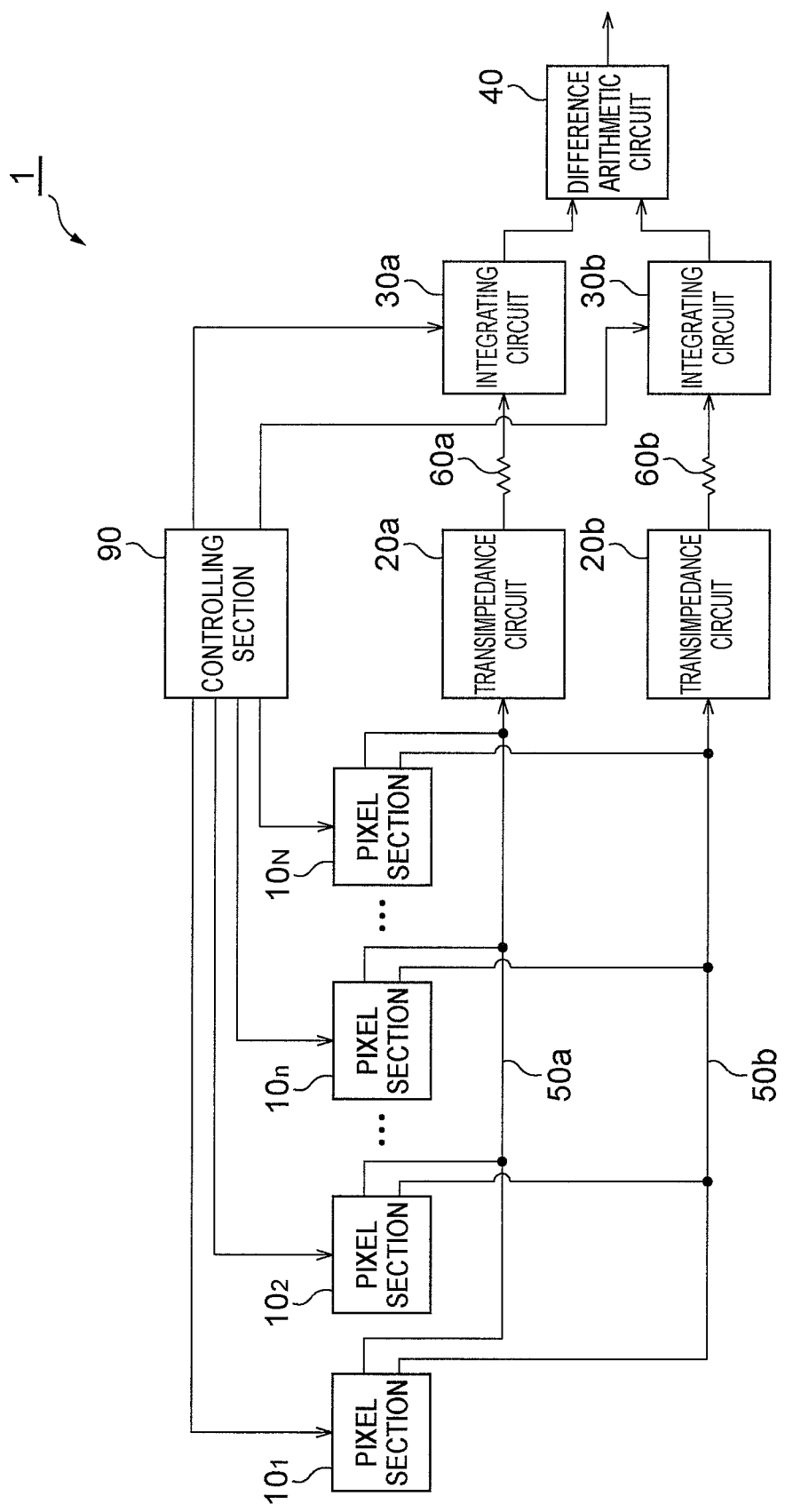
FIG. 1 is a configuration view of the solid-state imaging device 1 of the present embodiment.

1: solid-state imaging device
$10_1$ to $10_N$: pixel section
11: photoelectric converting circuit
12a, 12b: holding circuit
13: Integrating circuit
20a, 20b: transimpedance circuit
30a, 30b: Integrating circuit
40: difference arithmetic circuit
50a, 50b: common wire
90: Controlling section
PD: photodiode

BEST MODES FOR CARRYING OUT THE INVENTION

Hereinafter, a best mode for carrying out the present invention will be described in detail with reference to the accompanying drawings. In the description of the drawings, elements identical to each other will be referred to with identical reference numerals and letters, and overlapping description will be omitted.

FIG. 1 is a configuration view of a solid-state imaging device 1 of the present embodiment. The solid-state imaging device 1 shown in this drawing includes N pixel sections $10_1$ to $10_N$, a first transimpedance circuit 20a, a second transimpedance circuit 20b, a first integrating circuit 30a, a second integrating circuit 30b, a difference arithmetic circuit 40, and a Controlling section 90. Here, N is an integer not less than 2, and n appearing hereinafter is an integer not less than 1 and not more than N.

The N pixel sections $10_1$ to $10_N$ have a common configuration, and are one-dimensionally aligned, and include photodiodes which generate charges, the amounts of the generated charges corresponding to the intensities of the incident light. Each pixel section $10_n$ has two output terminals, and one output terminal is connected to a first common wire 50a, and the other output terminal is connected to a second common wire 50b.

The transimpedance circuit 20a and the transimpedance circuit 20b have a common configuration. An input terminal of the transimpedance circuit 20a is connected to the common wire 50a. An input terminal of the transimpedance circuit 20b is connected to the common wire 50b.

The integrating circuit 30a and the integrating circuit 30b have a common configuration. An input terminal of the integrating circuit 30a is connected to an output terminal of the transimpedance circuit 20a via a resistor 60a. An input terminal of the integrating circuit 30b is connected to an output terminal of the transimpedance circuit 20b via a resistor 60b.

The difference arithmetic circuit 40 has two input terminals, and one input terminal is connected to an output terminal of the integrating circuit 30a, and the other input terminal is connected to an output terminal of the integrating circuit 30b. The difference arithmetic circuit 40 inputs voltages output from the integrating circuit 30a and the integrating circuit 30b, respectively, and outputs a voltage corresponding to a difference between these two input voltages.

Figure 2:
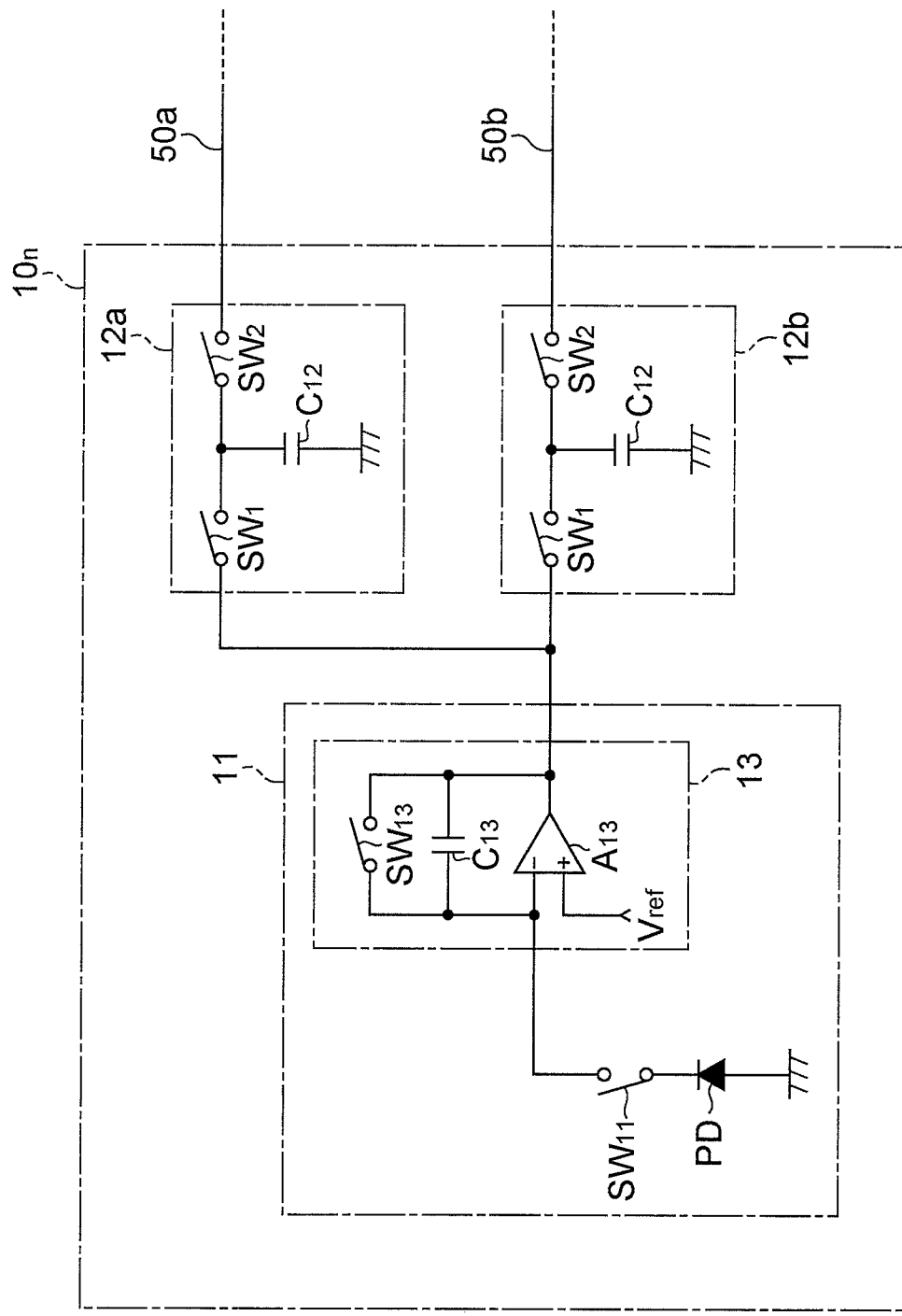
FIG. 2 is a circuit diagram of each pixel section $10_n$ included in the solid-state imaging device 1 of the present embodiment.

FIG. 2 is a circuit diagram of each pixel section $10_n$ included in the solid-state imaging device 1 of the present embodiment. Each pixel section $10_n$ includes a photoelectric converting circuit 11, a first holding circuit 12a, and a second holding circuit 12b. The holding circuit 12a and the holding circuit 12b have a common configuration.

The photoelectric converting circuit 11 is of a PPS (Passive Pixel Sensor) type, and includes a photodiode PD which generates charge quantities corresponding to an incident light amount, an integrating circuit 13 which outputs a voltage corresponding to the generated charge quantity, and a switch $SW_{11}$ provided between the photodiode PD and the integrating circuit 13. The integrating circuit 13 includes an amplifier $A_{13}$, a capacitor $C_{13}$, and a switch $SW_{13}$. An anode terminal of the photodiode PD is grounded, and a cathode terminal of the photodiode PD is connected to the switch $SW_{11}$. An inverting input terminal of the amplifier $A_{13}$ included in the integrating circuit 13 is connected to the cathode terminal of the photodiode PD via the switch $SW_{11}$. Into a non-inverting input terminal of the amplifier $A_{13}$ included in the integrating circuit 13, a fixed reference voltage Vref is input. The capacitor $C_{13}$ and the switch $SW_{13}$ are connected in parallel to each other, and provided between the inverting input terminal and the output terminal of the amplifier $A_{13}$.

In the integrating circuit 13 included in this photoelectric converting circuit 11, when the switch $SW_{13}$ closes, the capacitor $C_{13}$ is discharged, and a voltage to be output from the integrating circuit 13 is initialized. When the switch $SW_{13}$ opens and the switch $SW_{11}$ closes, charges accumulated in the junction capacitance section of the photodiode PD in response to light incidence on this photodiode PD are input into the integrating circuit 13 through the switch $SW_{11}$, and accumulated in the capacitor $C_{13}$. A voltage corresponding to a charge quantity accumulated in the capacitor $C_{13}$ is output from the integrating circuit 13.

Each of the holding circuits 12a and 12b holds a voltage output from the photoelectric converting circuit 11 and outputs a charge quantity corresponding to the held voltage to the common wire, and includes a capacitor $C_{12}$, a switch $SW_1$, and a switch $SW_2$. In each of the holding circuits 12a and 12b, one end of the capacitor $C_{12}$ is grounded, and the other end of the capacitor $C_{12}$ is connected to the output terminal of the amplifier $A_{13}$ of the integrating circuit 13 via the switch $SW_1$. In the holding circuit 12a, the other end of the capacitor $C_{12}$ is connected to the common wire 50a via the switch $SW_2$. In the holding circuit 12b, the other end of the capacitor $C_{12}$ is connected to the common wire 50b via the switch $SW_2$.

In these holding circuits 12a and 12b, when the switch $SW_1$ opens, a voltage output from the photoelectric converting circuit 11 before opening of the switch $SW_1$ is held by the capacitor $C_{12}$. Then, when the switch $SW_2$ closes, a charge quantity corresponding to the voltage held by the capacitor $C_{12}$ is output to the common wire 50a, 50b. The holding circuits 12a and 12b operate at different timings from each other. In other words, one holding circuit 12a holds an initial voltage (noise component) output from the integrating circuit 13 immediately after (at the time t1) the switch $SW_{13}$ opens from a closed state in the integrating circuit 13 included in the photoelectric converting circuit 11. If the switch $SW_{11}$ connected to the photodiode PD is opened at the time of acquisition of the initial voltage, a noise component in the integrating circuit 13 is held, and if the switch $SW_{11}$ is closed, a noise component caused by background light, etc., made incident on the photodiode PD is also held in addition to the noise component in the integrating circuit 13. At the time t1, the switch $SW_1$ is closed while the switch $SW_2$ of the holding circuit 12a is left open, however, thereafter, the switch $SW_1$ also opens quickly (time t2), and charges are held in the capacitor $C_{12}$ of the holding circuit 12a.

Immediately after the time t2, in a state where the switch $SW_{11}$ is connected, the switch $SW_1$ is closed (time t3) while the switch $SW_2$ of the holding circuit 12b is left open, and charges are accumulated in the capacitor $C_{12}$ of the holding circuit 12b. In other words, the other holding circuit 12b holds a voltage (signal component) which is output from the integrating circuit 13 while charges generated in the photodiode PD in response to light incidence are accumulated in the capacitor $C_{13}$ of the integrating circuit 13. On this signal component, a noise component caused by background light, etc., made incident on the photodiode PD is superimposed in addition to the noise component in the integrating circuit 13.

Figure 3:
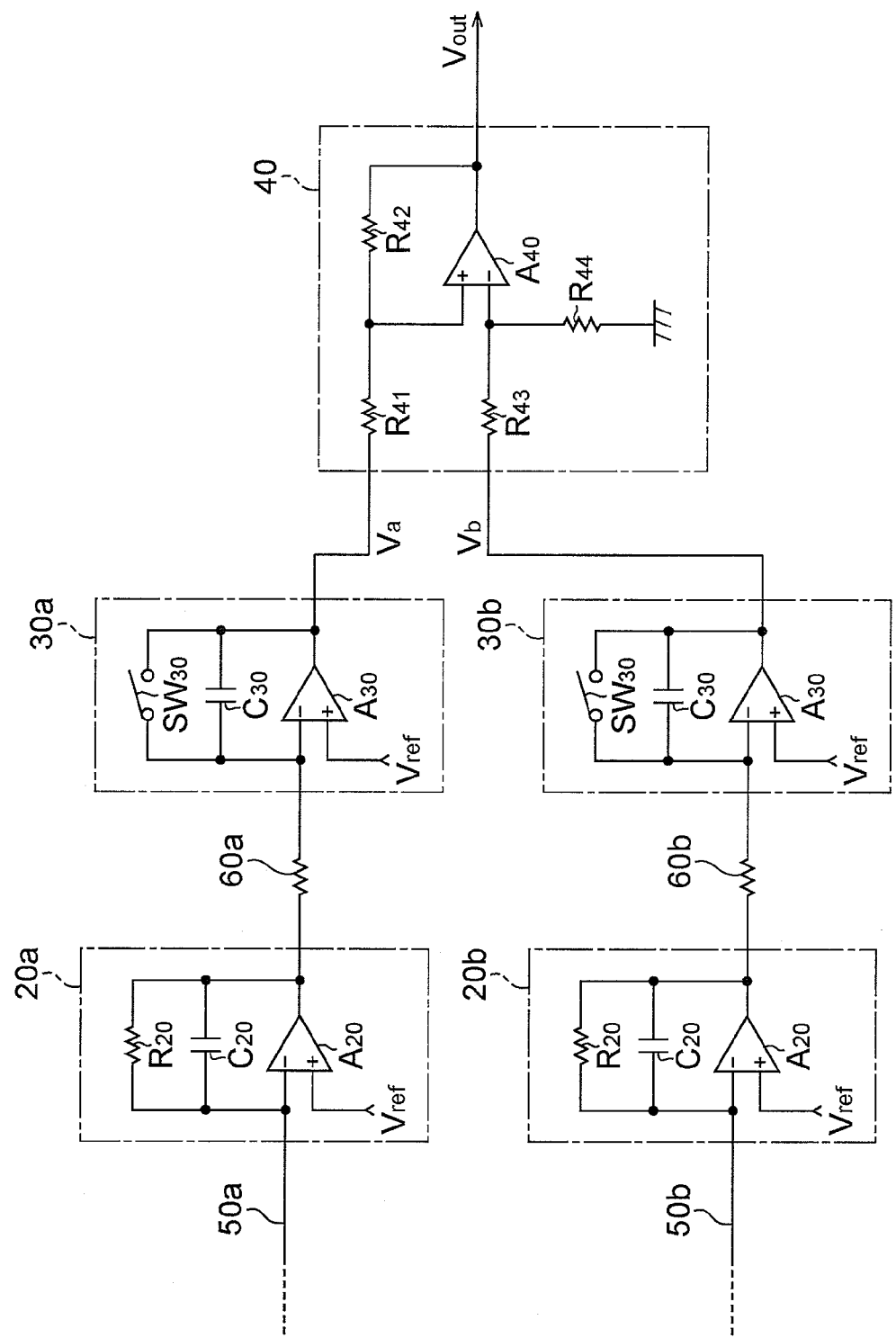
FIG. 3 is a circuit diagram of the transimpedance circuits 20a and 20b, the integrating circuits 30a and 30b, and the difference arithmetic circuit 40 included in the solid-state imaging device 1 of the present embodiment.

FIG. 3 is a circuit diagram of transimpedance circuits 20a and 20b, integrating circuits 30a and 30b, and a difference arithmetic circuit 40 included in the solid-state imaging device 1 of the present embodiment.

Each of the transimpedance circuits 20a and 20b includes an amplifier $A_{20}$, a capacitor $C_{20}$, and a resistor $R_{20}$. An inverting input terminal of the amplifier $A_{20}$ of the transimpedance circuit 20a is connected to the common wire 50a. An inverting input terminal of the amplifier $A_{20}$ of the transimpedance circuit 20b is connected to the common wire 50b. In each of the transimpedance circuits 20a and 20b, a fixed reference voltage Vref is input into a non-inverting input terminal of the amplifier $A_{20}$. The capacitor $C_{20}$ and the resistor $R_{20}$ are connected in parallel to each other, and provided between the inverting input terminal and the output terminal of the amplifier $A_{20}$.

In one transimpedance circuit 20a, when the switch $SW_2$ of the holding circuit 12a included in the pixel section $10_n$ closes (time t4), a charge quantity corresponding to a voltage held by the capacitor $C_{12}$ of the holding circuit 12a is input through the common wire 50a, and a pulse current having a pulse height corresponding to the input charge quantity is output to the integrating circuit 30a. In the other transimpedance circuit 20b, when the switch $SW_2$ of the holding circuit 12b included in the pixel section $10_n$ closes (time t4), a charge quantity corresponding to the voltage held by the capacitor $C_{12}$ of the holding circuit 12b is input through the common wire 50b, and a pulse current having a pulse height corresponding to the input charge quantity is output to the integrating circuit 30b.

Each of the integrating circuits 30a and 30b includes an amplifier $A_{30}$, a capacitor $C_{30}$, and a switch $SW_{30}$. An inverting input terminal of the amplifier $A_{30}$ of the integrating circuit 30a is connected to the output terminal of the transimpedance circuit 20a via a resistor 60a. An inverting input terminal of the amplifier $A_{30}$ of the integrating circuit 30b is connected to the output terminal of the transimpedance circuit 20b via a resistor 60b. In each of the integrating circuits 30a and 30b, a fixed reference voltage Vref is input into a non-inverting input terminal of the amplifier $A_{30}$. The capacitor $C_{30}$ and the switch $SW_{30}$ are connected in parallel to each other, and provided between the inverting input terminal and the output terminal of the amplifier $A_{30}$.

In each of the integrating circuits 30a and 30b, when the switch $SW_{30}$ closes, the capacitor $C_{30}$ is discharged, and a voltage to be output from the integrating circuit 30a, 30b is initialized. In one integrating circuit 30a, when the switch $SW_{30}$ opens, a current output from the transimpedance circuit 20a is input through the resistor 60a, and a charge quantity corresponding to the input current is accumulated in the capacitor $C_{30}$, and a voltage corresponding to the charge quantity accumulated in the capacitor $C_{30}$ is output from the integrating circuit 30a. In the other integrating circuit 30b, when the switch $SW_{30}$ is open, the current output from the transimpedance circuit 20b is input through the resistor 60b, and a charge quantity corresponding to the input current is accumulated in the capacitor $C_{30}$, and a voltage corresponding to the charge quantity accumulated in the capacitor $C_{30}$ is output from the integrating circuit 30b.

When pulse currents having pulse heights corresponding to charge quantities input from the transimpedance circuits 20a and 20b are input into the integrating circuits 30a and 30b, respectively, the switches $SW_{30}$ may be opened, and before this input, the switches $SW_{30}$ are closed once and the capacitors $C_{30}$ are respectively reset.

Here, in the present embodiment, the switch $SW_{30}$ is used, and it is also possible to use a resistor, however, when a resistor is used, charges which were integrated and accumulated in the capacitor $C_{30}$ are discharged by the resistor, and the voltage to be output from the integrating circuit 30b becomes smaller with time. As in the case of the present embodiment, by using a switch, charges accumulated in the capacitor are not discharged, and accordingly, a gain to be secured becomes higher.

The difference arithmetic circuit 40 includes an amplifier $A_{40}$ and resistors $R_{41}$ to $R_{44}$. An inverting input terminal of the amplifier $A_{40}$ is connected to the output terminal of the integrating circuit 30a via the resistor $R_{41}$, and connected to the output terminal of the amplifier $A_{40}$ via the resistor $R_{42}$. A non-inverting input terminal of the amplifier $A_{40}$ is connected to the output terminal of the integrating circuit 30b via the resistor $R_{43}$, and grounded via the resistor $R_{44}$. In this difference arithmetic circuit 40, when the resistance values of the resistors $R_{41}$ and $R_{43}$ are both defined as $R_1$, the resistance values of the resistors $R_{42}$ and $R_{44}$ are both defined as $R_2$, an output voltage of the integrating circuit 30a is defined as Va, and an output voltage of the integrating circuit 30b is defined as Vb, a voltage Vout to be output from the output terminal of the amplifier $A_{40}$ is expressed in the following equation (1). As shown in this equation, the voltage Vout to be output from the difference arithmetic circuit 40 is a product obtained by multiplying a difference between the output voltage Va of the integrating circuit 30a and the output voltage Vb of the integrating circuit 30b (Vb−Va) by a gain ($R_2/R_1$).

$$Vout=-(Vb-Va)R_2/R_1 \quad (1)$$

The Controlling section 90 outputs signals for controlling the opening and closing operations of the switch $SW_{11}$ and the switch $SW_{13}$ included in the photoelectric converting circuit 11 of each pixel section $10_n$, outputs signals for controlling the opening and closing operations of the switch $SW_1$ and the switch $SW_2$ included in the holding circuit 12a and the holding circuit 12b of each pixel section $10_n$, and outputs signals for controlling the opening and closing operations of the switches SW30 included in the integrating circuit 30a and the integrating circuit 30b, respectively. The solid-state imaging device 1 of the present embodiment operates based on control signals output from the Controlling section 90.

An example of an operation of the solid-state imaging device 1 of the present embodiment is as follows. The operation example described hereinafter is based on control signals output from the Controlling section 90.

In the pixel section $10_n$, when the switch $SW_{13}$ of the integrating circuit 13 closes, the capacitor $C_{13}$ is discharged, and a voltage to be output from the photoelectric converting circuit 11 is initialized. Further, at the moment that the switch $SW_{13}$ of the integrating circuit 13 opens, an integration-enabled state is obtained, and an initial voltage containing noise is generated from the interacting circuit 13. Thereafter, the switch $SW_1$ of the holding circuit 12a opens and closes, and accordingly, the initial voltage (noise component) output from the photoelectric converting circuit 11 at this time is held by the capacitor $C_{12}$ of the holding circuit 12a.

Subsequently, in the same pixel section $10_n$, when the switch $SW_{11}$ closes after the switch $SW_{13}$ of the integrating circuit 13 opens, charges accumulated in the junction capacitance section of the photodiode PD in response to light incidence on this photodiode PD are input into the integrating circuit 13 through the switch $SW_{11}$, and accumulated in the capacitor $C_{13}$. Then, a voltage corresponding to the charge quantity accumulated in the capacitor $C_{13}$ is output from the integrating circuit 13. Thereafter, the switch $SW_1$ of the holding circuit 12b opens and closes, and accordingly, the voltage (signal component+noise component) output from the photoelectric converting circuit 11 at this time is held by the capacitor $C_{12}$ of the holding circuit 12b.

In the pixel section $10_n$, when an initial voltage (noise component) is held by the holding circuit 12a and a voltage (signal component+noise component) is held by the holding circuit 12b as described above, thereafter, the switches $SW_2$ of the holding circuits 12a and 12b, respectively, close simultaneously only for a predetermined period.

A charge quantity corresponding to the voltage (noise component) held by the holding circuit 12a during the predetermined period in which the switch $SW_2$ of the holding circuit 12a of the pixel section $10_n$ closes is input into the transimpedance circuit 20a through the common wire 50a, and a pulse current having a pulse height corresponding to the input charge quantity is output from the transimpedance circuit 20a. The pulse current output from the transimpedance circuit 20a is input into the integrating circuit 30a through the resistor 60a. Then, a charge quantity corresponding to the input current is accumulated in the capacitor $C_{30}$ of the integrating circuit 30a, and a voltage (noise component) Va corresponding to the charge quantity accumulated in the capacitor $C_{30}$ is output from the integrating circuit 30a.

Similarly, a charge quantity corresponding to the voltage (signal component+noise component) held by the holding circuit 12b during the predetermined period in which the switch $SW_2$ of the holding circuit 12b of the pixel section $10_n$ closes is input into the transimpedance circuit 20b through the common wire 50b, and a pulse current having a pulse height corresponding to the input charge quantity is output from the transimpedance circuit 20b. The pulse current output from the transimpedance circuit 20b is input into the integrating circuit 30b through the resistor 60b. Then, a charge quantity corresponding to the input current is accumulated in the capacitor $C_{30}$ of the integrating circuit 30b, and a voltage (signal component+noise component) Vb corresponding to the charge quantity accumulated in the capacitor $C_{30}$ is output from the integrating circuit 30b.

The voltage (noise component) Va output from the integrating circuit 30a and the voltage (signal component+noise component) Vb output from the integrating circuit 30b are input into the difference arithmetic circuit 40. Then, a voltage Vout expressed in equation (1) described above is output from the difference arithmetic circuit 40.

When a series of operations described above of the pixel section $10_n$ are finished, the same operations are also performed for the next pixel section $10_{n+1}$. Thus, the same operations are successively performed for N pixel sections $10_1$ to $10_N$, and voltages Vout corresponding to incident light amounts on the photodiodes PD included in the N pixel sections $10_1$ to $10_N$, respectively, are successively output from the difference arithmetic circuits 40.

In the solid-state imaging device 1 of the present embodiment, in each pixel section $10_n$, a voltage corresponding to a charge quantity generated in the photodiode PD is output from the photoelectric converting circuit 11, and this voltage is held by the holding circuits 12a and 12b. Therefore, even if the junction capacitance of the photodiode PD included in each pixel section $10_n$ is high, the imaging speed is prevented from deteriorating.

The common wire 50a between the holding circuits 12a of the pixel sections $10_n$ and the transimpedance circuit 20a is connected to the inverting input terminal of the amplifier $A_{20}$ included in the transimpedance circuit 20a, and is maintained at the same fixed voltage as the voltage Vref input into the non-inverting input terminal of the amplifier $A_{20}$ being imaginarily short-circuited to the inverting input terminal. Similarly, the common wire 50b between the holding circuits 12b of the pixel sections $10_n$ and the transimpedance circuit $20b$ is also maintained at the fixed voltage. Therefore, even if the number of pixels N increases and the common wires $50a$ and $50b$ become longer, voltage decreases at the input terminals of the transimpedance circuits $20a$ and $20b$ are prevented, so that it is not necessary to increase the gain ($R_2/R_1$) in the difference arithmetic circuit 40, and therefore, in this regard, the imaging speed is also prevented from deteriorating.

The voltage Vout to be output from the difference arithmetic circuit 40 is a product obtained by multiplying a difference (Vb−Va) between the output voltage (noise component) Va of the integrating circuit $30a$ and the output voltage (signal component+noise component) Vb of the integrating circuit $30b$ by the gain ($R_2/R_1$). This difference (Vb−Va) corresponds to a difference between the voltages held by the holding circuits $12a$ and $12b$, respectively. Therefore, the voltage Vout to be output from the difference arithmetic circuit 40 becomes highly accurate because a noise component such as an offset, reset noise, and background light, etc., contained in the output voltage of the integrating circuit 13 is removed.

Further, generally, the transimpedance circuits $20a$ and $20b$ have wide bandwidths, so that a thermal noise component is easily superimposed on their output signals. However, high-frequency components of the output signals from the transimpedance circuits $20a$ and $20b$ are cut-off by the integrating circuits $30a$ and $30b$, so that output signals from the integrating circuits $30a$ and $30b$ have reduced thermal noise components.

To increase the imaging speed, the smaller the product ($C_f R_f$) of the capacity $C_f$ of the capacitor $C_{20}$ and the resistance value $R_f$ of the resistor $R_{20}$ included in each of the transimpedance circuits $20a$ and $20b$, the more preferable. To increase the imaging speed, the smaller the ratio ($C_h/C_f$) of the capacity $C_h$ of the capacitor $C_{12}$ included in each of the holding circuits $12a$ and $12b$ of each pixel section $10_n$ to the capacity $C_f$ of the capacitor $C_{20}$ included in each of the transimpedance circuits $20a$ and $20b$, the more preferable as well. Further, to increase the imaging sensitivity, the larger the resistance value $R_f$ of the resistor $R_{20}$ included in each of the transimpedance circuits $20a$ and $20b$, the more preferable. Therefore, these parameters have especially preferable ranges for increasing the imaging speed and imaging sensitivity.

Figure 4:
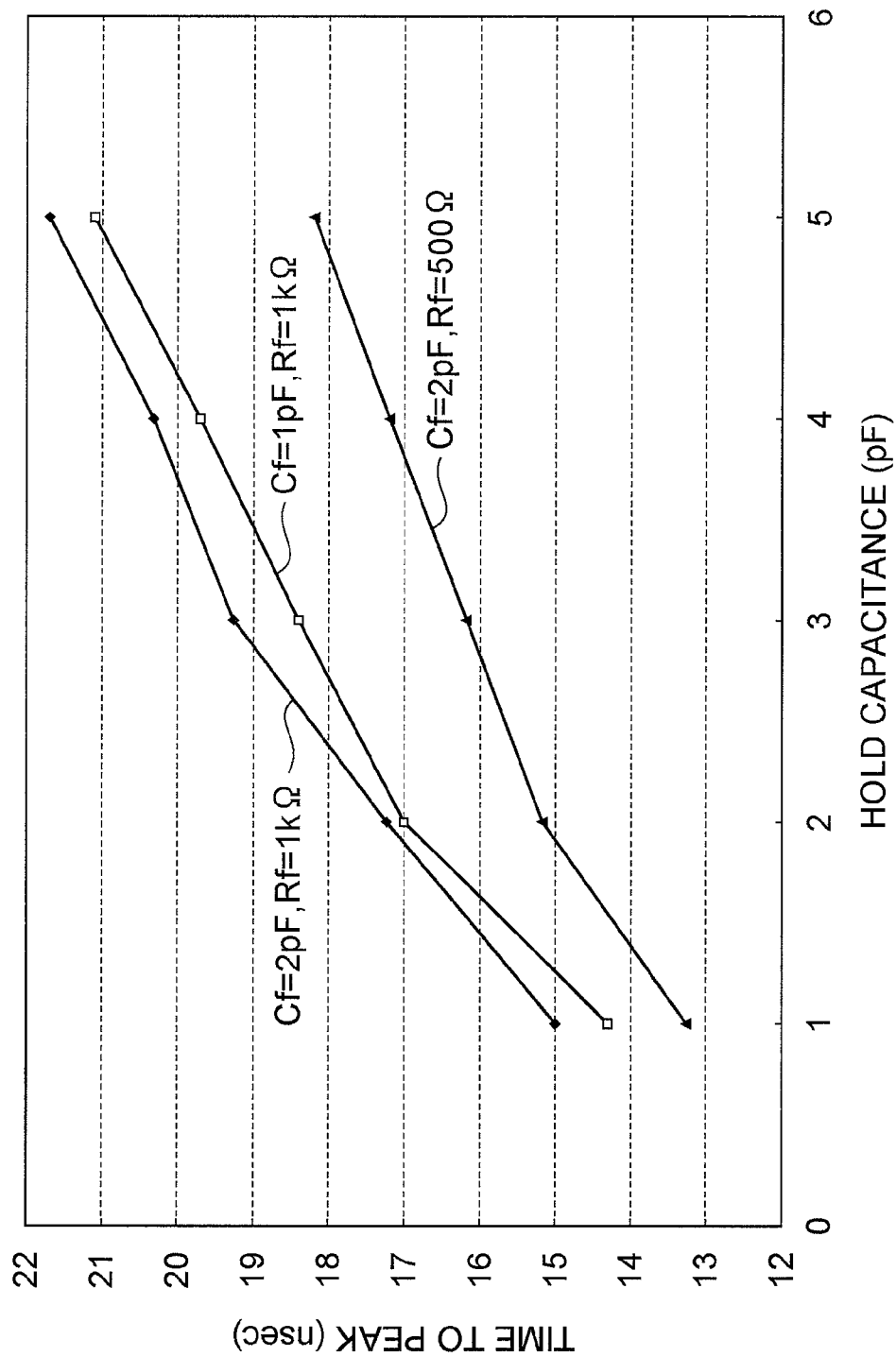
FIG. 4 is a graph showing a relationship between a capacity $C_h$ of the capacitor $C_{12}$ included in each of the holding circuits 12a and 12b of each pixel section $10_n$ and a time to peak of a pulse signal output from the transimpedance circuit 20a, 20b.
Figure 5:
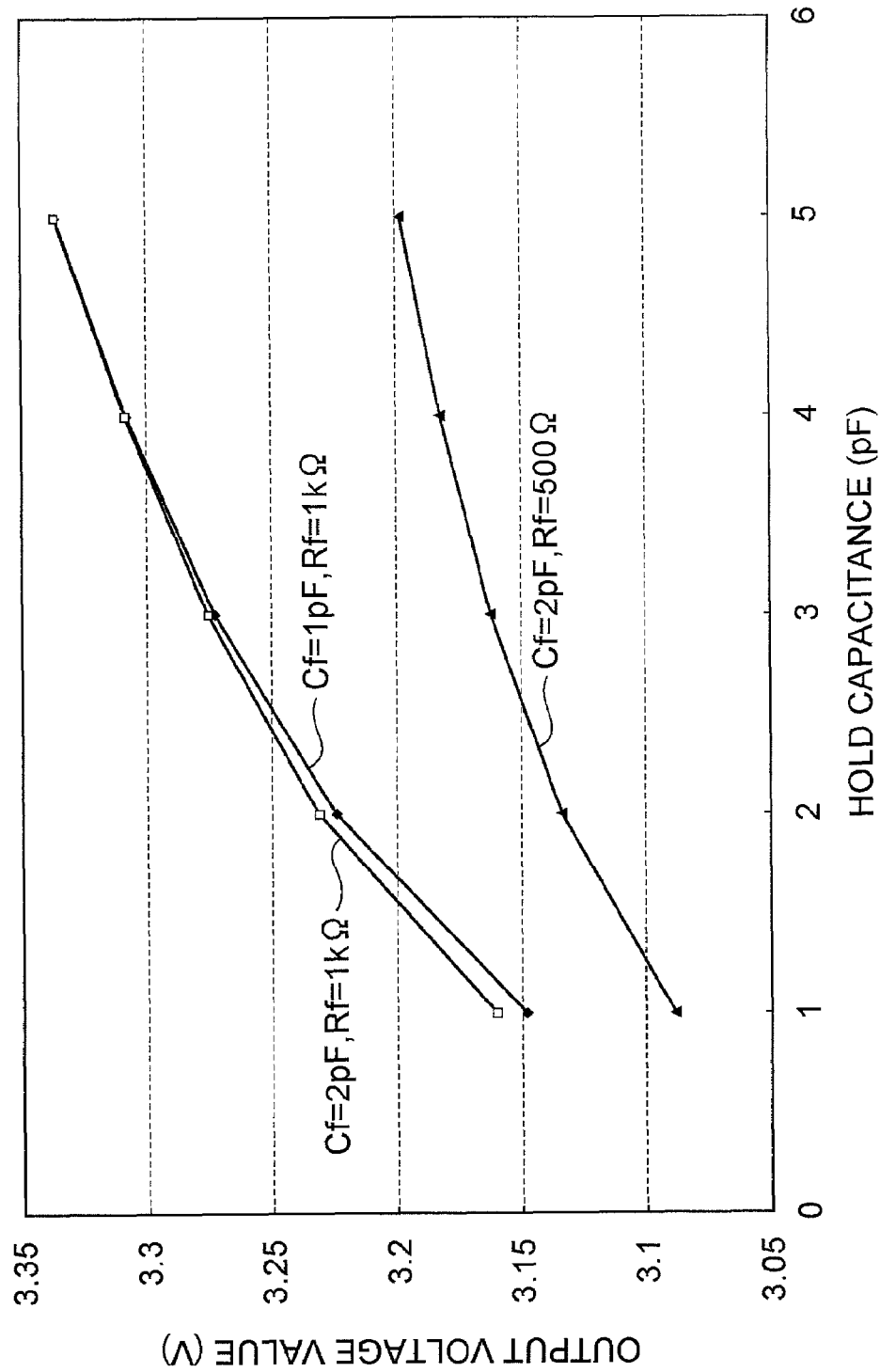
FIG. 5 is a graph showing the relationship between the capacity $C_h$ of the capacitor $C_{12}$ included in each of the holding circuits 12a and 12b of each pixel section $10_n$ and a pulse height of a pulse signal output from the transimpedance circuit 20a, 20b.

FIG. 4 is a graph showing a relationship between the capacity (hold capacitance) $C_h$ of the capacitor $C_{12}$ included in each of the holding circuits $12a$ and $12b$ of each pixel section $10_n$, and a time to peak of a pulse signal output from the transimpedance circuit $20a$, $20b$. FIG. 5 is a graph showing a relationship between a capacity (hold capacitance) $C_h$ of the capacitor $C_{12}$ included in each of the holding circuits $12a$ and $12b$ of each pixel section $10_n$, and a pulse height (output voltage value) of a pulse signal output from the transimpedance circuit $20a$, $20b$. In these drawings, the capacity $C_f$ of the capacitor $C_{20}$ and the resistance value $R_f$ of the resistor $R_{20}$ included in each of the transimpedance circuits $20a$ and $20b$ in the three cases including a case where $C_f$ is 2 pF and $R_f$ is 1 kΩ, a case where $C_f$ is 1 pF and $R_f$ is 1 kΩ, and a case where $C_f$ is 2 pF and $R_f$ is 500Ω, are shown.

As is understood from these drawings, even if the product ($C_f R_f$) expressing a time constant of the transimpedance circuit $20a$, $20b$ is the same, the larger the capacity $C_f$ of the capacitor $C_{20}$, the shorter the time to peak (the higher the imaging speed) and the lower the pulse height of the output pulse signal (the lower the sensitivity). According to results of simulations under other various conditions, to increase the imaging speed and imaging sensitivity, preferably, the capacity $C_h$ of the capacitor $C_{12}$ included in each of the holding circuits $12a$ and $12b$ of each pixel section $10_n$ is in the range of 1 pF to 2 pF, and preferably, the capacity $C_f$ of the capacitor $C_{20}$ included in each of the transimpedance circuits $20a$ and $20b$ is in the range of 1 pF to 5 pF (more preferably, 1 pF to 3 pF). In these ranges, the imaging speed and imaging sensitivity can be increased higher than other cases.

The present invention is not limited to the above-described embodiment, and can be variously modified. For example, the photoelectric converting circuit 11 included in each pixel section $10_n$ is of a PPS type in the embodiment described above, however, an APS (Active Pixel Sensor) type may also be used.

The invention claimed is:

1. A solid-state imaging device comprising:
 a plurality of pixel sections including, respectively, photoelectric converting circuits which include photodiodes for generating charges corresponding to intensities of incident lights and output voltages corresponding to the amounts of the generated charges, and holding circuits which hold voltages output from the photoelectric converting circuits and successively output the charges to a common wire, the amounts of the charges output to the common wire corresponding to the held voltages;
 a transimpedance circuit including a first amplifier, a first capacitor, and a resistor, where the first capacitor and the resistor are connected in parallel to each other and provided between an input terminal and an output terminal of the first amplifier, and the input terminal of the first amplifier is connected to the common wire; and
 an integrating circuit which includes a second amplifier, a second capacitor, and a switch, where the second capacitor and the switch are connected in parallel to each other and provided between an input terminal and an output terminal of the second amplifier, and the input terminal of the second amplifier is connected to the output terminal of the first amplifier of the transimpedance circuit,
 wherein the transimpedance circuit is connected to the integrating circuit so as to transmit a pulse current from the transimpedance circuit to the integrating circuit, wherein
 each of the plurality of pixel sections includes a first holding circuit and a second holding circuit as a holding circuit, and
 the solid-state imaging device further comprises:
 a first common wire connected to the first holding circuit and a second common wire connected to the second holding circuit as the common wire;
 a first transimpedance circuit connected to the first common wire and a second transimpedance circuit connected to the second common wire as the transimpedance circuit;
 a first integrating circuit connected to the first transimpedance circuit and a second integrating circuit connected to the second transimpedance circuit as the integrating circuit; and
 a difference arithmetic circuit which inputs voltages output from the first integrating circuit and the second integrating circuit, respectively, and outputs a voltage corresponding to a difference between the input two voltages, and
 wherein the capacity of a capacitor for holding a voltage in the holding circuit is in the range of 1 pF to 2 pF.

2. The solid-state imaging device according to claim 1, wherein the capacity of the first capacitor of the transimpedance circuit is in the range of 1 pF to 5 pF.

* * * * *

UNITED STATES PATENT AND TRADEMARK OFFICE
CERTIFICATE OF CORRECTION

PATENT NO. : 8,537,258 B2  Page 1 of 1
APPLICATION NO. : 12/528692
DATED : September 17, 2013
INVENTOR(S) : Mizuno et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 215 days.

Signed and Sealed this
Fifteenth Day of September, 2015

Michelle K. Lee
*Director of the United States Patent and Trademark Office*